United States Patent
Benjamin et al.

(10) Patent No.: US 12,286,233 B2
(45) Date of Patent: Apr. 29, 2025

(54) PARACHUTE ASSEMBLIES WITH MULTI-STAGE REEFING

(71) Applicant: Rockwell Collins, Inc., Cedar Rapids, IA (US)

(72) Inventors: Jeff Benjamin, Colorado Springs, CO (US); Kassidy L Carson, Colorado Springs, CO (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 232 days.

(21) Appl. No.: 17/902,735

(22) Filed: Sep. 2, 2022

(65) Prior Publication Data

US 2024/0076045 A1    Mar. 7, 2024

(51) Int. Cl.
*B64D 17/34* (2006.01)
*B64D 17/02* (2006.01)
*B64D 17/38* (2006.01)

(52) U.S. Cl.
CPC .......... *B64D 17/343* (2013.01); *B64D 17/02* (2013.01); *B64D 17/386* (2013.01)

(58) Field of Classification Search
CPC . B64D 17/34; B64D 17/343; B64D 17/00–80
See application file for complete search history.

(56) References Cited

U.S. PATENT DOCUMENTS

| | | | |
|---|---|---|---|
| 4,752,050 A * | 6/1988 | Johnson | B64D 17/343 244/152 |
| 4,846,423 A | 7/1989 | Reuter | |
| 7,195,205 B1 * | 3/2007 | Lee | B64D 17/343 244/142 |
| 7,703,720 B2 | 4/2010 | Smith et al. | |
| 8,096,509 B2 | 1/2012 | Fox, Jr. | |
| 8,608,112 B1 | 12/2013 | Levay | |
| 10,689,123 B2 | 6/2020 | Fox, Jr. | |
| 2007/0075189 A1 | 4/2007 | Lee | |
| 2007/0252042 A1 * | 11/2007 | Smith | B64D 17/343 244/149 |
| 2008/0099623 A1 | 5/2008 | Lee | |
| 2010/0187363 A1 | 7/2010 | Smith et al. | |
| 2022/0033095 A1 * | 2/2022 | Holstine | B64D 25/10 |

OTHER PUBLICATIONS

"Reefing Cutter Device" Copenhagen Suborbitals <https://copenhagensuborbitals.com/reefing-cutter-device/> (Year: 2017).*
United Kingdom Intellectual Property Office, United Kingdom Search Report dated Dec. 15, 2023 in Application No. GB2312306.0.

* cited by examiner

*Primary Examiner* — Richard Green
*Assistant Examiner* — Nevena Aleksic
(74) *Attorney, Agent, or Firm* — SNELL & WILMER L.L.P.

(57) ABSTRACT

A parachute assembly may comprise a canopy and one or more reefing lines. The one or more reefing lines may limit inflation of the canopy to attenuate impulse load or otherwise mitigate forces exerted by the parachute assembly on cargo or an occupant during deployment of the canopy. The one or more reefing lines may be broken in stages to selectively limit inflation of the canopy followed by selectively permitting inflation of the canopy in stages.

19 Claims, 9 Drawing Sheets

PARACHUTE ASSEMBLIES WITH MULTI-STAGE REEFING

FIELD

The present disclosure relates to parachute assemblies, and more specifically, to parachute assemblies having multi-stage reefing.

BACKGROUND

Parachutes may be used to slow and stabilize an object (e.g., ejection seat or a person) supported by the parachute. Parachutes typically comprise a canopy to increase drag, and suspension lines coupled to the canopy. The suspension lines may be woven or otherwise bound to one another to form risers configured to attach the object to the parachute and stabilize the object. The object may be an ejection seat, an occupant of an ejection seat, or other form of payload coupled to the risers. During the deployment of the parachute, potentially dangerous loads may be generated and imparted by the risers onto the occupant as a parachute is opened and begins to slow the occupant's decent. These loads, often referred to as "shock loads" or "snatch loads" present a safety risk to the occupant.

SUMMARY

A parachute assembly is disclosed herein. In accordance with various embodiments, the parachute assembly may comprise a parachute canopy, a first reefing line, a second reefing line, and a first cutter. The first reefing line may be disposed adjacent an edge of the parachute canopy to restrict inflation of the parachute canopy. The second reefing line may be a reefing line insert coupled between a first portion of the first reefing line and a second portion of the first reefing line. The first cutter may be configured to break the second reefing line in response to a passing of a first elapsed period of time after a first triggering event, wherein the breaking the second reefing line causes a lengthening of the first reefing line.

The parachute assembly may have one or more additional aspect as well. For instance, the first triggering event may be an ejection from an aircraft cockpit of an occupant who is connected to the parachute assembly. The first triggering event may be a deployment of the parachute canopy. In various embodiments, at least a portion of the reefing line insert is located within an internal volume of the first reefing line. The parachute assembly may include a first stitching coupling a first segment of the reefing line insert to the first portion of the first reefing line and a second stitching coupling a second segment of the reefing line insert to the second portion of the first reefing line. A third segment of the reefing line insert may be located external to the first reefing line, the third segment extending between the first segment and the second segment.

In various instances, the reefing line insert includes a first segment located within an internal volume of the first reefing line, a second segment located within the internal volume of the first reefing line, and a third segment located external to the first reefing line and extending between the first segment and the second segment. Moreover, the parachute assembly may have a second cutter configured to break at least one of the first reefing line and the second reefing line in response to a passing of a second elapsed period of time after a second triggering event, wherein the lengthening of the first reefing line is the second triggering event. A tether line may be provided. The tether line may connect a trigger of the second cutter to the second reefing line to initiate the second triggering event by the lengthening of the first reefing line. The first cutter and the second cutter may be pyrotechnic cutters. The first cutter and the second cutter may each include electrically operated cutting blades.

A further example parachute assembly may be provided. The parachute assembly may include a parachute canopy, a first reefing line, a second reefing line, a first cutter, and a second cutter. The first reefing line may have a first length and may be disposed adjacent an edge of the parachute canopy to restrict inflation of the parachute canopy. The second reefing line may have a second length and may be disposed adjacent the first reefing line of the parachute canopy to restrict inflation of the parachute canopy. The first cutter may be configured to break the first reefing line in response to a passing of a first elapsed period of time after a first triggering event. The second cutter may be configured to break the second reefing line in response to a passing of a second elapsed period of time after the breaking the first reefing line.

The parachute assembly may include one or more other aspect as well. For example, the parachute assembly may include a tether line connecting a trigger of the second cutter to the first reefing line to trigger the second cutter by the breaking of the first reefing line. The first triggering event may be an ejection from an aircraft cockpit of an occupant who is connected to the parachute assembly. The first cutter and the second cutter may be pyrotechnic cutters having fixed time delays corresponding to the first elapsed period of time and the second elapsed period of time, respectively. A third cutter may be configured to break the first reefing line in response to the passing of the first elapsed period of time after the first triggering event, the third cutter providing redundancy to the first cutter. A fourth cutter may be configured to break the second reefing line in response to the passing of the second elapsed period of time after the breaking the first reefing line, the fourth cutter providing redundancy to the second cutter.

A method of staged parachute deployment may be provided. The method may include deploying a canopy of the parachute assembly. The method may include increasing a tensile load applied to a first reefing line having a first length and disposed adjacent an edge of the parachute canopy for the restricting of inflation of the parachute canopy. The method may include breaking, by a first cutter, the first reefing line in response to a passing of a first elapsed period of time after a first triggering event. The method may include, subsequently to the breaking the first reefing line, increasing a tensile load applied to a second reefing line having a second length and disposed adjacent the first reefing line of the parachute canopy for the restricting of inflation of the parachute canopy, wherein the second length is selected to provide less restricting of inflation of the parachute canopy than the first length. Finally, the method may include breaking, by a second cutter, the second reefing line in response to a passing of a second elapsed period of time after the breaking the first reefing line. In various embodiments, the method includes tensioning a tether line connecting a trigger of the second cutter to the first reefing line to initiate a start of the second elapsed period of time by the breaking of the first reefing line. The first cutter and the second cutter may be pyrotechnic cutters. The first cutter and the second cutter each may include electrically operated cutting blades.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
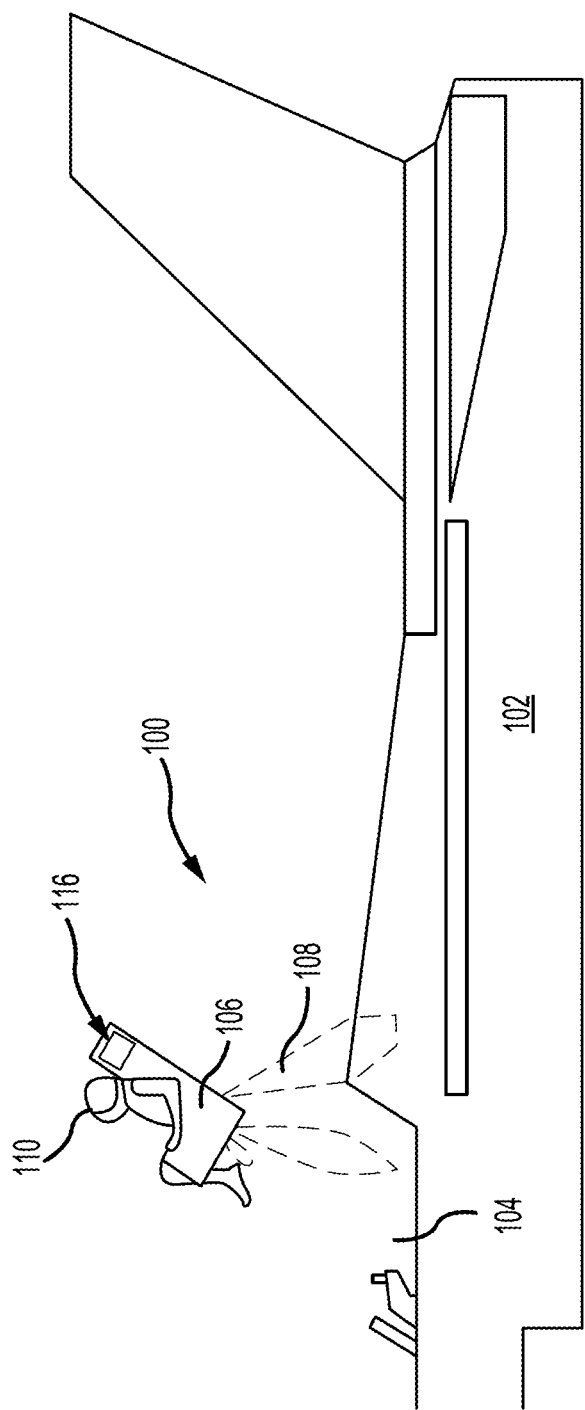
FIG. 1 illustrates an ejection seat being launched from an aircraft cockpit, in accordance with various embodiments.

With reference to FIG. 1, an aircraft ejection system 100 is shown. Aircraft ejection system 100 may be installed in aircraft 102 to safely expel ejection seat 106 and an occupant 110 of ejection seat 106 from cockpit 104 of aircraft 102. Ejection seat 106 may be urged from cockpit 104 by a propulsion system 108. Aircraft ejection system 100 may include a parachute assembly 116. In various embodiments, prior to deployment of parachute assembly 116, a portion of parachute assembly 116 may be stored within ejection seat 106.

Figure 2:
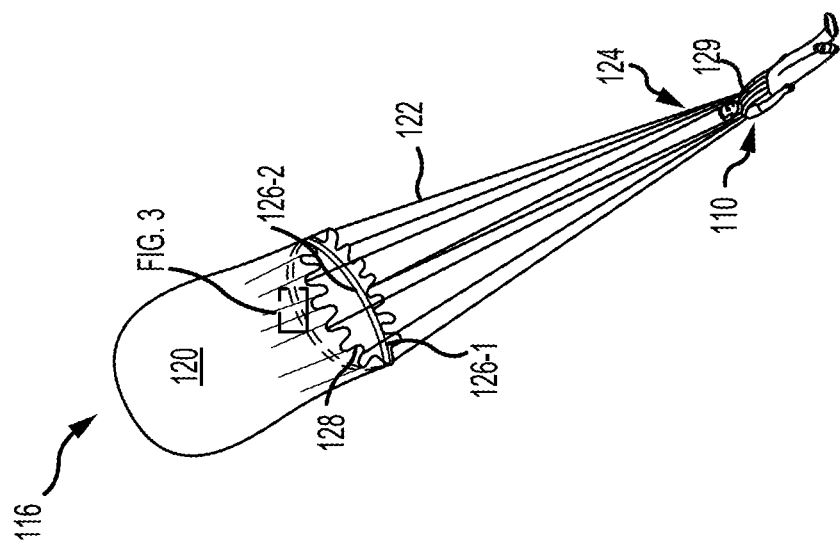
FIG. 2 illustrates an occupant being supported by a deployed parachute assembly having a first reefing line and a second reefing line separate from the first reefing line, in accordance with various embodiments.

With reference to FIG. 2, the parachute assembly 116 is illustrated in a deployed state. The parachute assembly 116 may be used to increase a drag of, or otherwise decelerate, the occupant 110 in response to the occupant 110 being ejected, jumped, ditched, and/or dropped (collectively, "ejected") from an aircraft. The parachute assembly 116 may comprise a canopy 120, suspension lines 122, and risers 124.

Upon deployment of parachute assembly 116, the canopy 120 may open to increase drag, or otherwise decelerate, occupant 110. The canopy 120 may comprise any suitable type of canopy and any suitable type of material, such as, for example, canvas, silk, nylon, aramid fiber (e.g., KEVLAR®), polyethylene terephthalate, and/or the like. The suspension lines 122 may be coupled to canopy 120 using any suitable attachment technique, such as, for example, through stitching. The suspension lines 122 may be configured to at least partially stabilize deployed canopy 120. The suspension lines 122 may be weaved or otherwise bound to one another to form risers 124. The risers 124 may be configured to attach to a harness 129, or other structure, configured to secure occupant 110 to risers 124. Stated differently, suspension lines 122 and risers 124 are configured to couple an object (e.g., harness 129 and occupant 110) to the canopy 120. Suspension lines 122 and risers 124 may comprise any suitable material. For example, suspension lines 122 may comprise a tubular braided material that constricts in diameter under tension, such as, for example, nylon, aramid fiber (e.g., KEVLAR®), and/or the like. Risers 124 may comprise a webbing formed from the weaved or otherwise bound together material of suspension lines 122.

In various embodiments, the parachute assembly 116 may include one or more reefing line(s). FIG. 2 illustrates a first reefing line 126-1 and a second reefing line 126-2 that is separate from the first reefing line 126-1. Reefing lines 126-1, 126-2 may be coupled to the canopy 120 proximate a circumferential edge (e.g. skirt) 128 of canopy 120. In various embodiments, the first reefing line 126-1 is adjacent to the circumferential edge 128 of the canopy 120 and the second reefing line 126-2 is adjacent to the first reefing line 126-1 and disposed further from the circumferential edge 128 of the canopy 120 than the first reefing line 126-1. Reefing lines 126-1, 126-2 are configured to restrict expansion of canopy 120 such that canopy 120 opens in stages. For example, the first reefing line 126-1 may be cut, or otherwise severed, at a preselected time after deployment of canopy 120. Prior to cutting first reefing line 126-1, canopy 120 is held at a first, restricted diameter; after first reefing line 126-1 is severed, canopy 120 is able to open further and its diameter increases. The diameter is restricted by the second reefing line 126-2. The second reefing line 126-2 may be cut, or otherwise severed, at a preselected time after deployment of canopy 120 and/or after severing of the first reefing line 126-1. After second reefing line 126-2 is severed, the canopy 120 is able to open still further and its diameter increases still further. Opening the canopy 120 in stages may reduce opening shock to the parachute assembly 116. The first time delay between deploying the canopy 120 and severing the first reefing line 126-1 may comprise any suitable time delay based on properties of the parachute assembly 116, the type of aircraft, and/or the load limitations of the object (e.g., occupant 110) being carried by parachute assembly 116. The second time delay between severing the first reefing line 126-1 and severing the second reefing line 126-2 may comprise any suitable time delay based on properties of parachute assembly 116, the type of aircraft, and/or the load limitations of the object (e.g., occupant 110) being carried by the parachute assembly 116.

Figure 3:
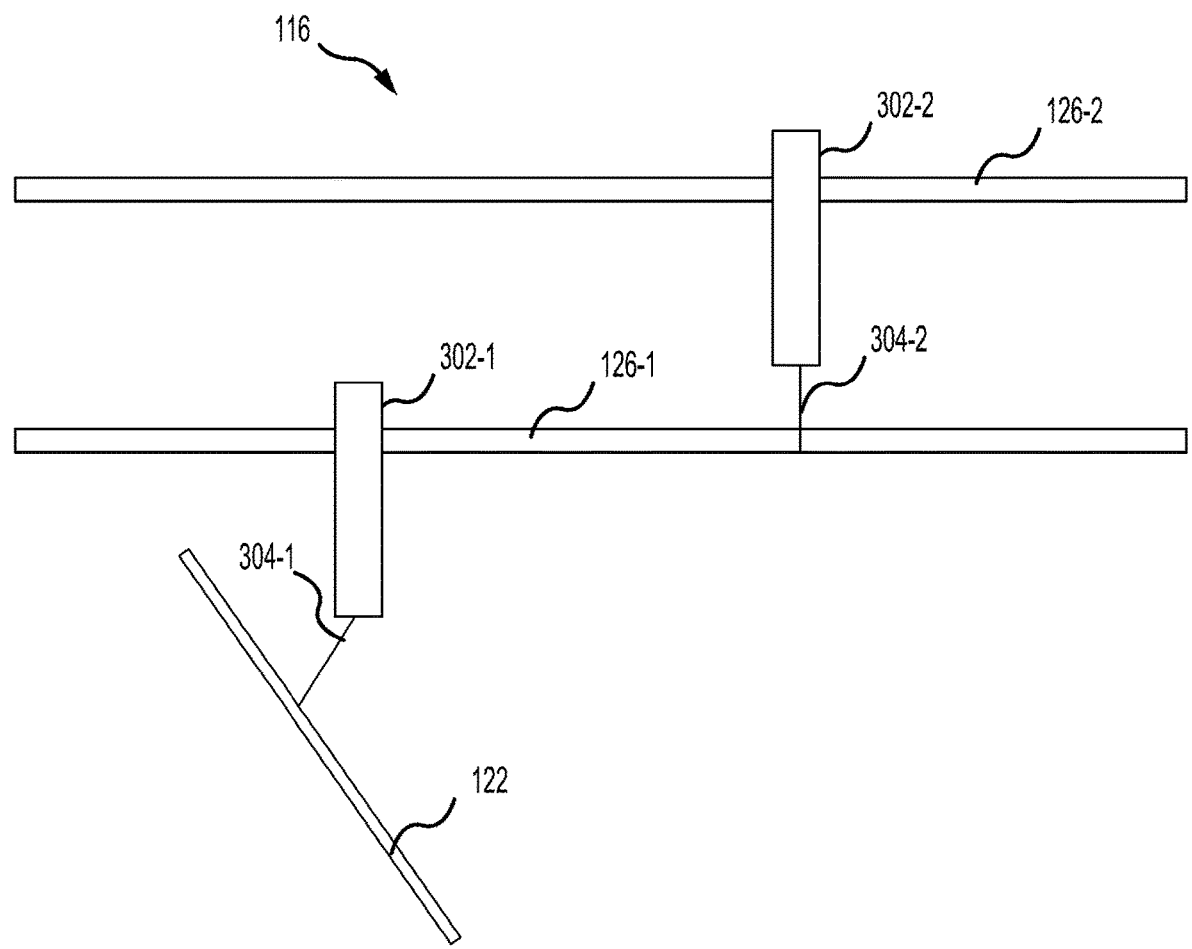
FIG. 3 illustrates a block diagram of the first reefing line, the second reefing line, a suspension line, and cutters of a parachute assembly according to FIG. 2, in accordance with various embodiments.

With reference now to FIG. 3, a block diagram of various components of the parachute assembly 116 of FIG. 2 is illustrated. The first reefing line 126-1 is shown in connection with a first cutter 302-1 configured to break the first reefing line 126-1 after a first elapsed duration of time. The first cutter 302-1 is connected by a first tether 304-1 to a suspension line 122. In further instances, the first cutter 302-1 is connected by the first tether to the ejection seat. The tether may be pulled by an increasing of tension on the suspension line 122 and/or a departure of the ejection seat parachute module during an ejection event. The pulling of the tether 304-1 starts a timer that causes the first cutter 302-1 to break the first reefing line 126-1 after the passage of the first elapsed duration of time.

The second reefing line 126-2 is shown in connection with a second cutter 302-2 configured to break the second reefing line 126-2 after a second elapsed duration of time. The second cutter 302-2 is connected by a second tether 304-2 to the first reefing line 126-1. The second tether 304-2 may be pulled by the first reefing line 126-1 as it breaks. The pulling of the second tether 304-2 starts a timer that causes the second cutter 302-2 to break the second reefing line 126-2 after the passage of the second elapsed duration of time.

In various instances, the first cutter 302-1 may have an electrically operated blade, or may be a pyrotechnic device, or any device configured to cut a reefing line. Similarly, the second cutter 302-2 may have an electrically operated blade, or may be a pyrotechnic device, or any device configured to cut a reefing line.

Figure 4:
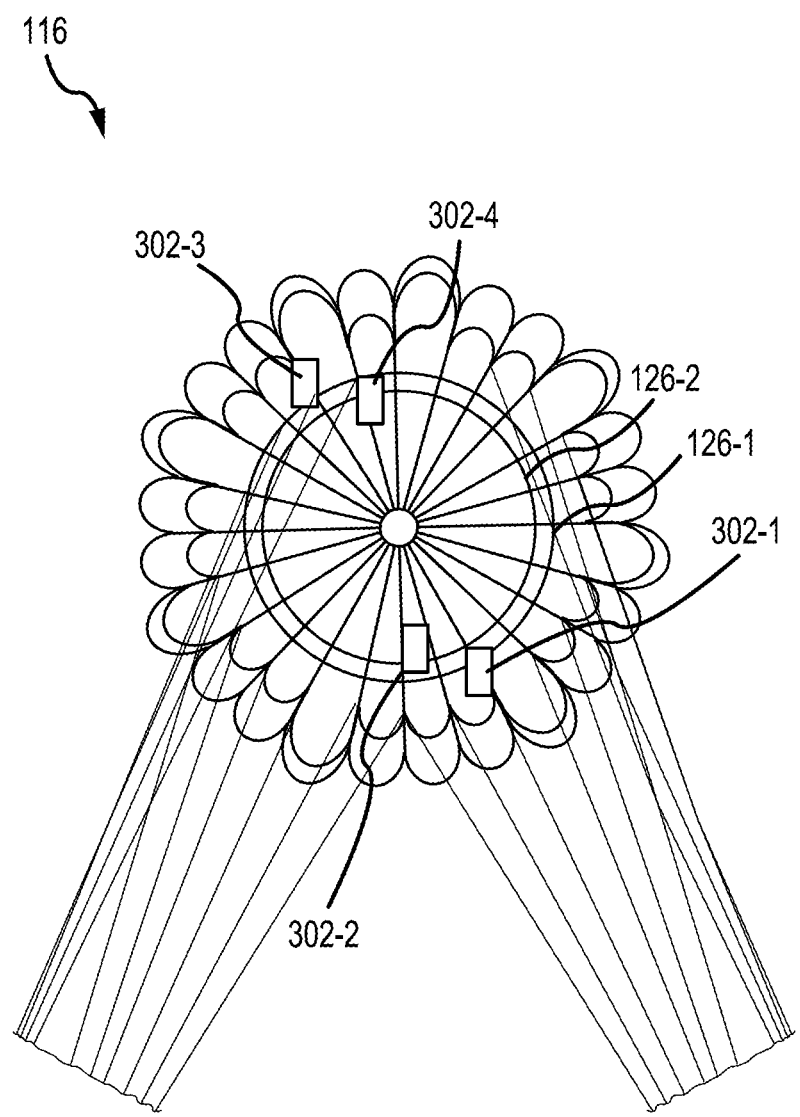
FIG. 4 illustrates a view of the parachute assembly according to FIG. 2 from a bottom looking upward, in accordance with various embodiments.

In various embodiments, the first cutter 302-1 and second cutter 302-2 may be emplaced on a canopy 120 in connection with redundant or backup cutters. For instance, in FIG. 4, an example arrangement of a first reefing line 126-1 is shown in connection with the first cutter 302-1 and a third cutter 302-3 that provides redundancy. Similarly, a second reefing line 126-2 is shown in connection with the second cutter 302-2 and a fourth cutter 302-4 that provides redundancy. Thus, one may appreciate that features of the block diagram of FIG. 3, may be duplicated to provide for redundancy on a canopy 120.

Figure 5:
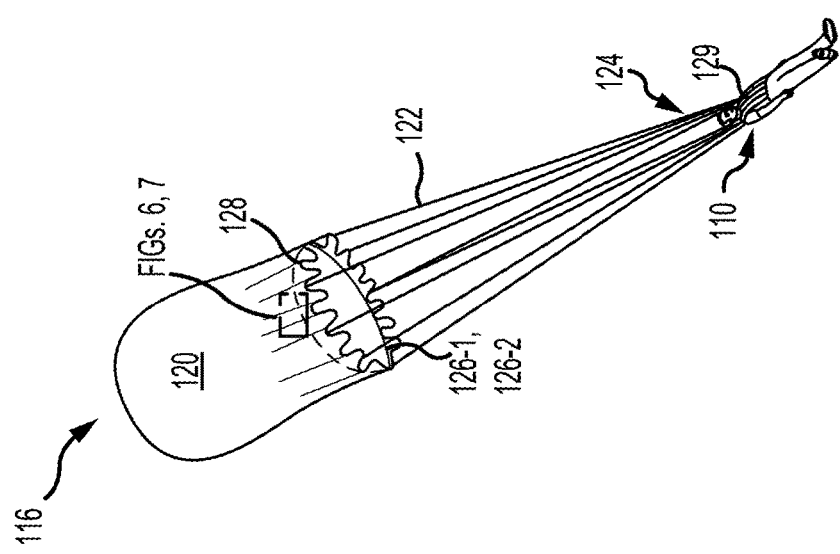
FIG. 5 illustrates an occupant being supported by a deployed parachute assembly having a first reefing line and a second reefing line comprising one or more insert(s) of the first reefing line, in accordance with various embodiments.

Turning now to FIG. 5, another configuration of the parachute assembly having multiple reefing lines is illustrated. Like reference numerals refer to like elements as in the discussion of FIG. 2. Notably, the first reefing line 126-1 and the second reefing line 126-2 are not illustrated as separate. As will be discussed in greater detail below, the second reefing line 126-2 may comprise one or more insert(s) that is attached to or inserted into the first reefing line 126-1 to selectably modify a length of first reefing line 126-1. For instance, a second reefing line 126-2 may comprise a reefing line insert that is inserted into the first reefing line 126-1 at two points, and that is relatively longer than the spacing between those two points. The first reefing lines 126-1 may be coupled to canopy 120 proximate a circumferential edge 128 of canopy 120 and the second reefing line 126-2 may include one or multiple reefing line inserts that is/are inserted the first reefing line 126-1 at different locations. A portion of the first reefing line 126-1 between ends of a reefing line insert may be cut by a reefing line cutter, to cause the first reefing line 126-1 to lengthen until the reefing line insert is taut. In this manner, the second reefing line 126-2 and the first reefing line 126-1 may interoperate so that the canopy 120 opens in stages.

More specifically, reefing lines 126-1, 126-2 are configured to restrict expansion of canopy 120 such that canopy 120 opens in stages. For example, the first reefing line 126-1 may be cut, or otherwise severed, at a preselected time after deployment of canopy 120 at a location between two points connected to a reefing line insert (e.g., second reefing line 126-2). Prior to cutting first reefing line 126-1, canopy 120 is held at a first, restricted diameter; after first reefing line 126-1 is severed, canopy 120 is able to open further and its diameter increases. The diameter is restricted by the second reefing line 126-2 that provides a reefing line insert into the first reefing line 126-1 between two points on opposite sides of where the first reefing line 126-1 was cut. The combination of the second reefing line 126-2 and remaining, uncut portions of the first reefing line 126-1 may be referred to as the second reefing line 126-2 for convenience. The second reefing line 126-1 may be cut, or otherwise severed, at a preselected time after deployment of canopy 120 and/or after severing of the first reefing line 126-1. After second reefing line 126-2 is severed, the canopy 120 is able to open still further and its diameter increases still further. Opening the canopy 120 in stages may reduce opening shock to the parachute assembly 116. The first time delay between deploying the canopy 120 and severing the first reefing line 126-1 may comprise any suitable time delay based on properties of the parachute assembly 116, the type of aircraft, and/or the load limitations of the object (e.g., occupant 110) being carried by parachute assembly 116. The second time delay between severing the first reefing line 126-1 and severing the second reefing line 126-2 may comprise any suitable time delay based on properties of the parachute assembly 116, the type of aircraft, and/or the load limitations of the object (e.g., occupant 110) being carried by parachute assembly 116.

Figure 6:
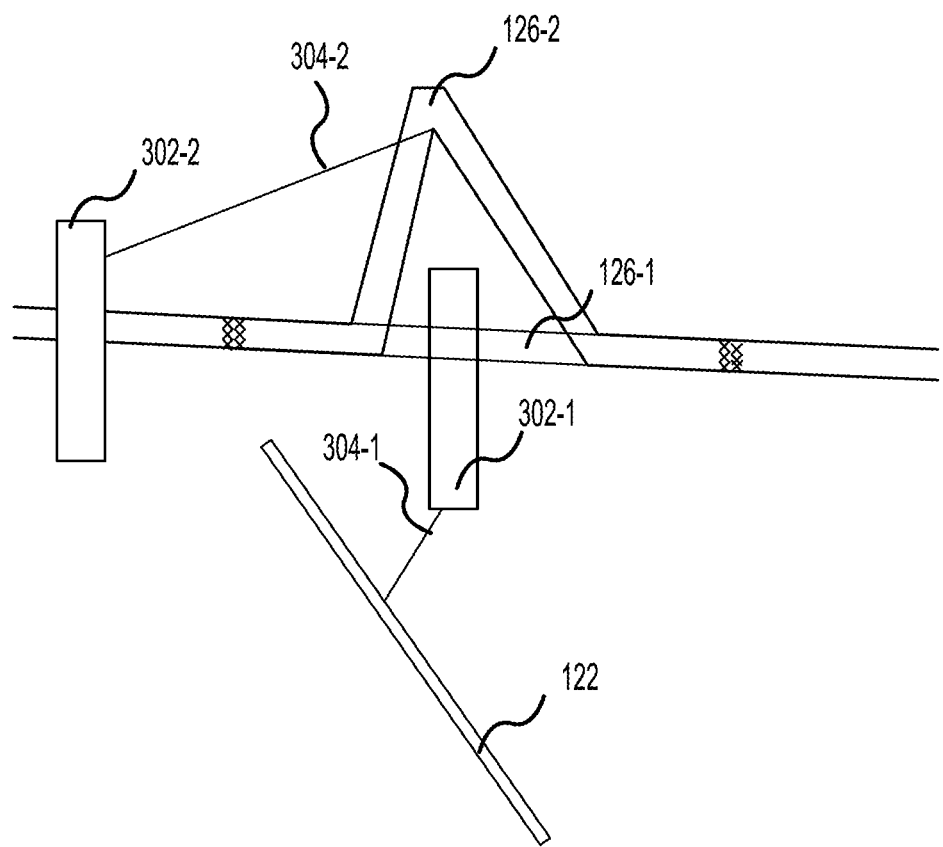
FIG. 6 illustrates a block diagram of the first reefing line, the second reefing line, and cutters of the parachute assembly according to FIG. 5, in accordance with various embodiments.

With reference now to FIG. 6, a block diagram of various components of the parachute assembly 116 of FIG. 5 is illustrated. The first reefing line 126-1 is shown in connection with a first cutter 302-1 configured to break the first reefing line 126-1 after a first elapsed duration of time. The first cutter 302-1 is connected by a first tether 304-1 to a suspension line 122. In further instances, the first cutter 302-1 is connected by the first tether to the ejection seat. The tether may be pulled by an increasing of tension on the suspension line 122 and/or a departure of the ejection seat parachute module during an ejection event. The pulling of the tether 304-1 starts a timer that causes the first cutter 302-1 to break the first reefing line 126-1 after the passage of the first elapsed duration of time.

The second reefing line 126-2 is shown in connection with a second cutter 302-2 configured to break the second reefing line 126-2 after a second elapsed duration of time. As discussed, the second reefing line 126-2 may be a reefing line insert connected at two points to the first reefing line 126-1 and a combination of remaining uncut portions of the first reefing line 126-1 with the reefing line insert of the second reefing line 126-2, may be referred to as a second reefing line 126-2 for convenience. The second cutter 302-2 is connected by a second tether 304-2 to the second reefing line 126-2 or a remaining portion of the first reefing line 126-1. The second tether 304-2 may be pulled by the first reefing line 126-1 as it breaks. The pulling of the second tether 304-2 starts a timer that causes the second cutter 302-2 to break the second reefing line 126-2 and/or a remaining portion of the first reefing line 126-1 after the passage of the second elapsed duration of time.

In various instances, the first cutter 302-1 may have an electrically operated blade, or may be a pyrotechnic device, or any device configured to cut a reefing line. Similarly, the second cutter 302-2 may have an electrically operated blade, or may be a pyrotechnic device, or any device configured to cut a reefing line.

Figure 7:
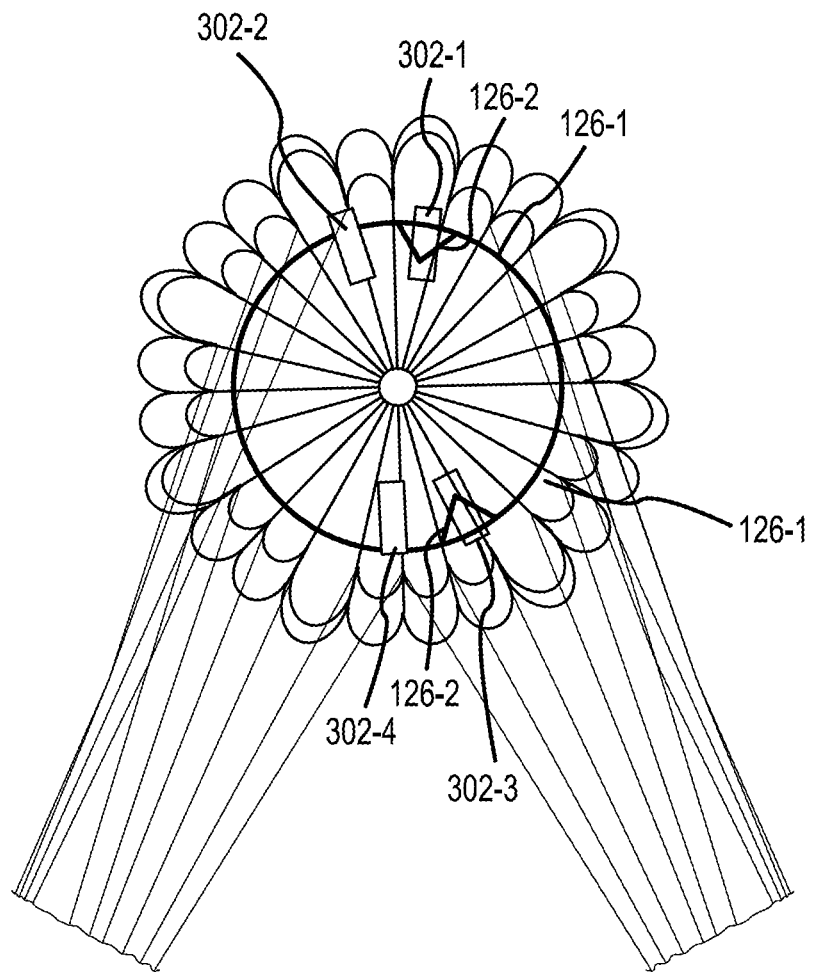
FIG. 7 illustrates a view of the parachute assembly according to FIG. 5, from a bottom looking upward, in accordance with various embodiments.

In various embodiments, the first cutter 302-1 and second cutter 302-2 may be emplaced on a canopy 120 in connection with redundant or backup cutters. For instance, in FIG. 7, an example arrangement of a first reefing line 126-1 is shown in connection with the first cutter 302-1 and a third cutter 302-3 that provides redundancy. Similarly, a second reefing line 126-2 is shown in connection with the second cutter 302-2 and a fourth cutter 302-4 that provides redundancy. Thus, one may appreciate that features of the block diagram of FIG. 6, may be duplicated to provide for redundancy on a canopy 120.

Figure 8:
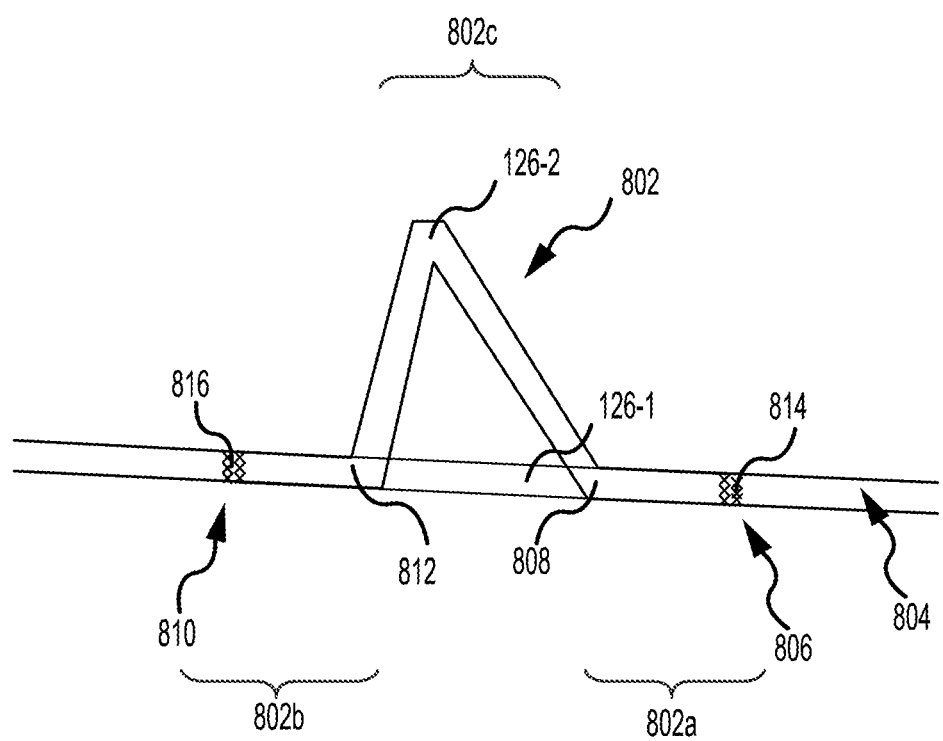
FIG. 8 illustrates a close-up block diagram view of the first reefing line and the second reefing line of a parachute assembly according to FIG. 5, in accordance with various embodiments.

With reference to FIG. 8, FIG. 6 is reproduced, but with the line cutters omitted so that specific features of the first reefing line 126-1 and the second reefing line 126-2 may be shown without clutter. In accordance with various embodiments, a first reefing line 126-1 may have a second reefing line 126-2 connected to it providing a reefing line insert 802. In various embodiments, reefing line insert 802 may comprise a textile or other material similar or identical to a reefing line. In various embodiments, first reefing line 126-1 comprises a tubular, braided material and, at least, a portion of the reefing line insert (the second reefing line 126-2) may be located in an internal volume 804 of first reefing line 126-1. For example, a first segment 802a and a second segment 802b of the reefing line insert 802 may be located in internal volume 804 and a third segment 802c may be located outside (i.e., external to) internal volume 804. First segment 802a extends from a first end 806 of the reefing line insert to an opening 808 in the first reefing line 126-1. Second segment 802b extends from a second end 810 of the reefing line insert 802 to an opening 812 in first reefing line 126-1. Third segment 802c extends between opening 808 and opening 812 (i.e., between first segment 802a and second segment 802b). In various embodiments, the second reefing line 126-2 may be coupled to first reefing line 126-1 via stitching 814, 816.

In various embodiments, a length of the reefing line between openings 812, 808 is different (e.g., shorter) than a length of the third segment 802c. As such, when first reefing line 126-1 is severed between openings 812 and 808 by a line cutter, the combination of first and second reefing lines 126-1, 126-2 lengthens according to the additional length of third segment 802c. The combination of first and second reefing lines 126-1, 126-2 can then be severed again, to permit full opening of the parachute. Moreover, one may appreciate that in various embodiments, the different sections of the first and second reefing lines 126-1, 126-2 may be exchanged or rearranged, to the same effect, specifically, causing a shortened portion that when severed, releases a load, allowing a line to extend until a slack portion takes up the load released by the severed shortened portion.

Figure 9:
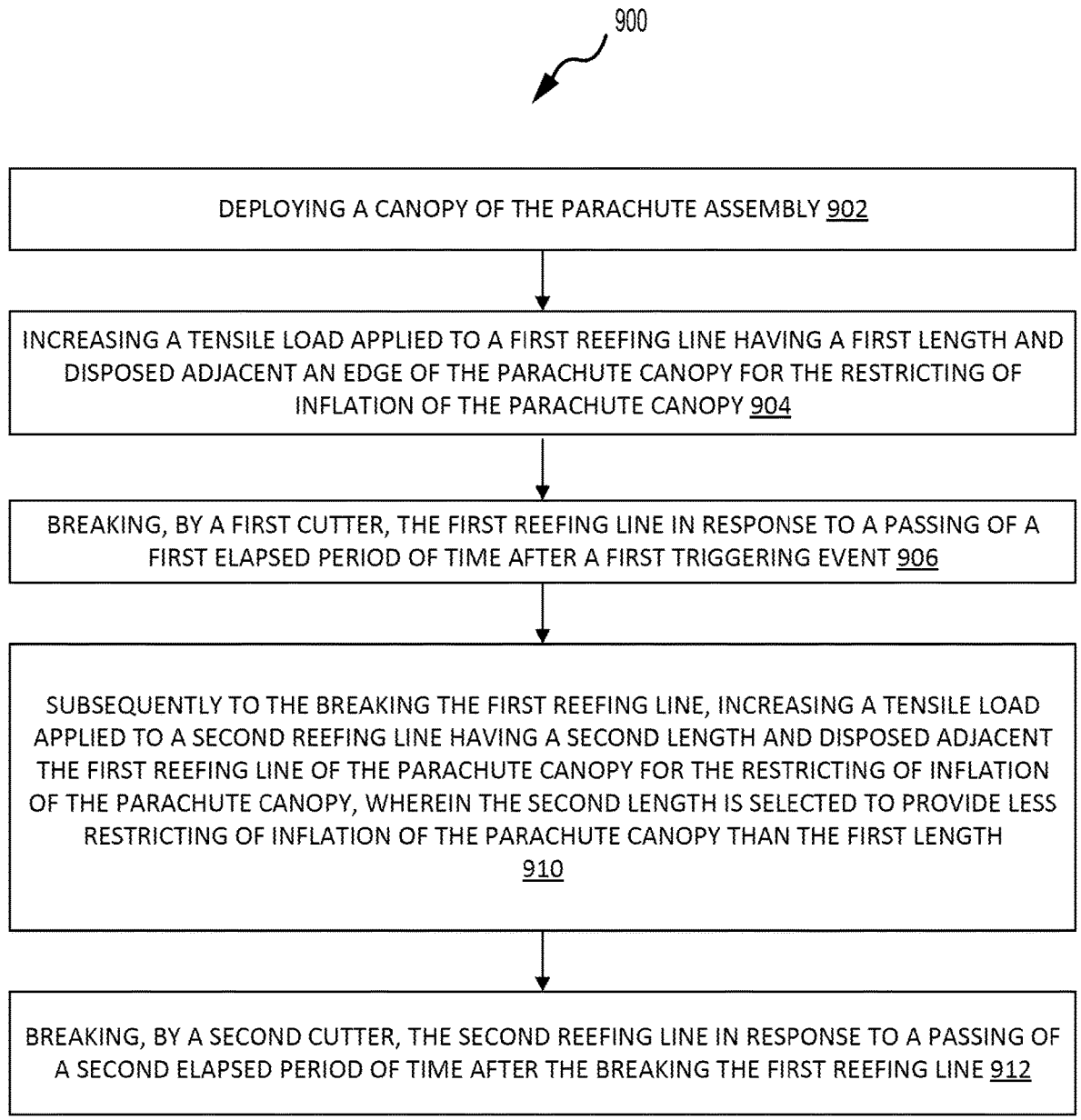
FIG. 9 illustrates a method of staged parachute deployment, in accordance with various embodiments.

Directing attention now to FIG. 9, a method 900 of staged parachute deployment implementing the systems and devices herein, may be provided. The method may include deploying a canopy of the parachute assembly (block 902). The method may include increasing a tensile load applied to a first reefing line having a first length and disposed adjacent an edge of the parachute canopy for the restricting of inflation of the parachute canopy (block 904). The method may include breaking, by a first cutter, the first reefing line in response to a passing of a first elapsed period of time after a first triggering event (block 906). Subsequently to the breaking the first reefing line, the method may include, increasing a tensile load applied to a second reefing line having a second length and disposed adjacent the first reefing line of the parachute canopy for the restricting of inflation of the parachute canopy (block 910). The second length is selected to provide less restricting of inflation of the parachute canopy than the first length. The method may further include breaking, by a second cutter, the second reefing line in response to a passing of a second elapsed period of time after the breaking the first reefing line (block 912). A tensioning of a tether line connecting a trigger of the second cutter to the first reefing line may initiate a start of the second elapsed period of time by the breaking of the first reefing line.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A parachute assembly, comprising:
   a parachute canopy;
   a first reefing line disposed adjacent an edge of the parachute canopy to restrict inflation of the parachute canopy;
   a second reefing line comprising a reefing line insert coupled between a first portion of the first reefing line and a second portion of the first reefing line; and
   a first cutter configured to break the second reefing line in response to a passing of a first elapsed period of time after a first triggering event, wherein breaking the second reefing line causes a lengthening of the first reefing line.

2. The parachute assembly according to claim 1, wherein the first triggering event is an ejection from an aircraft cockpit of an occupant who is connected to the parachute assembly.

3. The parachute assembly according to claim 1, wherein the first triggering event is a deployment of the parachute canopy.

4. The parachute assembly of claim 1, wherein at least a portion of the reefing line insert is located within an internal volume of the first reefing line.

5. The parachute assembly of claim 1, further comprising:
   a first stitching coupling a first segment of the reefing line insert to the first portion of the first reefing line; and
   a second stitching coupling a second segment of the reefing line insert to the second portion of the first reefing line.

6. The parachute assembly of claim 5, wherein a third segment of the reefing line insert is located external to the first reefing line, the third segment extending between the first segment and the second segment.

7. The parachute assembly of claim 1, wherein the reefing line insert includes:
   a first segment located within an internal volume of the first reefing line;
   a second segment located within the internal volume of the first reefing line; and
   a third segment located external to the first reefing line and extending between the first segment and the second segment.

8. The parachute assembly according to claim 1, further comprising a second cutter configured to break at least one of the first reefing line and the second reefing line in response to a passing of a second elapsed period of time after a second triggering event, wherein the lengthening of the first reefing line is the second triggering event.

9. The parachute assembly according to claim 8, further comprising a tether line connecting a trigger of the second cutter to the second reefing line to initiate the second triggering event by the lengthening of the first reefing line.

10. The parachute assembly according to claim 1, wherein the first cutter is a pyrotechnic cutter.

11. The parachute assembly according to claim 1, wherein the first cutter includes electrically operated cutting blades.

12. A parachute assembly, comprising:
    a parachute canopy;
    a first reefing line having a first length and disposed adjacent an edge of the parachute canopy to restrict inflation of the parachute canopy;
    a second reefing line having a second length and disposed adjacent the first reefing line of the parachute canopy to restrict inflation of the parachute canopy;
    a first cutter configured to break the first reefing line in response to a passing of a first elapsed period of time after a first triggering event;
    a second cutter configured to break the second reefing line in response to a passing of a second elapsed period of time after the breaking the first reefing line; and
    a tether line connecting a trigger of the second cutter to the first reefing line to trigger the second cutter by the breaking of the first reefing line, a first end of the tether line is attached to the first reefing line and a second end of the tether line is attached to the second cutter, and the tether line is configured to be pulled with the first reefing line as the first reefing line breaks.

13. The parachute assembly according to claim 12, wherein the first triggering event is an ejection from an aircraft cockpit of an occupant who is connected to the parachute assembly.

14. The parachute assembly according to claim 12, wherein the first cutter and the second cutter are pyrotechnic cutters having fixed time delays corresponding to the first elapsed period of time and the second elapsed period of time, respectively.

15. The parachute assembly according to claim 12, further comprising a third cutter configured to break the first reefing line in response to the passing of the first elapsed period of time after the first triggering event, the third cutter providing redundancy to the first cutter; and
    a fourth cutter configured to break the second reefing line in response to the passing of the second elapsed period of time after the breaking the first reefing line, the fourth cutter providing redundancy to the second cutter.

16. A method of staged parachute deployment comprising:
    deploying a parachute canopy of the parachute assembly;
    increasing a tensile load applied to a first reefing line having a first length and disposed adjacent an edge of the parachute canopy for restricting of inflation of the parachute canopy;
    breaking, by a first cutter, the first reefing line in response to a passing of a first elapsed period of time after a first triggering event;
    tensioning a tether line connecting a trigger of a second cutter to the first reefing line to initiate a start of a second elapsed period of time by the breaking of the first reefing line, a first end of the tether line is attached to the first reefing line and a second end of the tether line is attached to the second cutter, and the tensioning the tether line connecting the trigger of the second cutter to the first reefing line includes pulling the tether line with the first reefing line as the first reefing line breaks;

subsequently to the breaking the first reefing line, increasing a tensile load applied to a second reefing line having a second length and disposed adjacent the first reefing line of the parachute canopy for the restricting of inflation of the parachute canopy, wherein the second length is selected to provide less restricting of inflation of the parachute canopy than the first length; and breaking, by the second cutter, the second reefing line in response to a passing of the second elapsed period of time.

17. The method according to claim 16, wherein the first cutter and the second cutter are pyrotechnic cutters.

18. The method according to claim 16, wherein the first cutter and the second cutter each include electrically operated cutting blades.

19. The parachute assembly according to claim 12, wherein the second reefing line is disposed further from the edge of the canopy than the first reefing line.

\* \* \* \* \*